July 2, 1929.   G. C. CAPPA   1,719,390
STABILIZING LINKAGE FOR FRONT WHEEL BRAKED MOTOR CARS
Filed Sept. 20, 1926   2 Sheets-Sheet 1

Inventor
Giulio Cesare Cappa,
by
atty.

Patented July 2, 1929.

1,719,390

UNITED STATES PATENT OFFICE.

GIULIO CESARE CAPPA, OF TURIN, ITALY.

STABILIZING LINKAGE FOR FRONT-WHEEL-BRAKED MOTOR CARS.

Application filed September 20, 1926. Serial No. 136,574.

The use of front wheel brakes on motor cars is always increasing, but the design of the front axle and springs has not been basically altered, notwithstanding the added stresses imposed by braking, many accidents have been caused by this fact.

When the front brakes are applied, brake drum and axle would rotate with the wheel if the springs did not keep them in their former position. The front axle is therefore subject to torsional and flexo-torsional stresses (because it is generally sunk below the wheel axis) which it cannot resist well, as it has generally an I or channel section. The front spring assumes an S shaped elastic curve as shown in Fig. 1 in dotted lines.

This invention refers to a stabilizing rod which discharges the braking torque directly on the frame, and relieves the front axle and springs from all abnormal stresses. It has also the advantage that the rebound of the car when it stops, due to the recoil of the springs, is completely eliminated.

The accompanying drawings illustrate two constructional forms of this invention.

Figure 1:
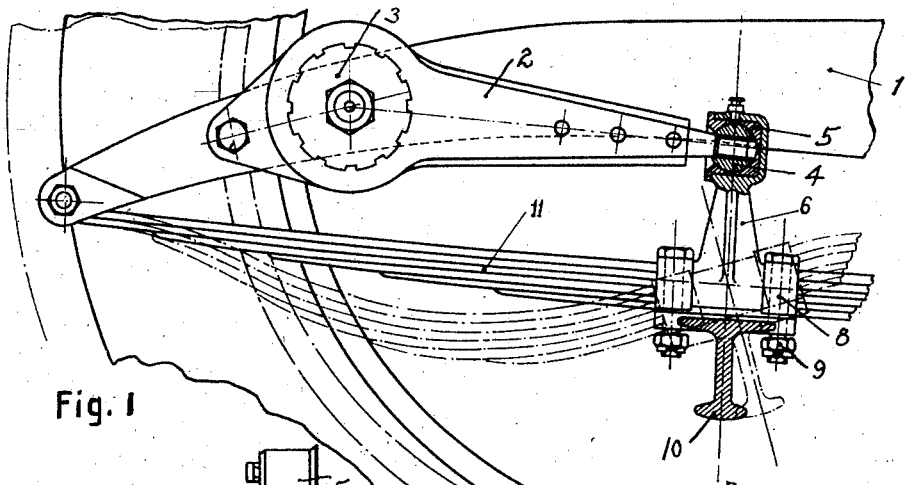
Figs. 1 and 2 show a side view and cross section on line A B of Fig. 1 respectively of a first constructional form of the object of this invention.
Figure 5:
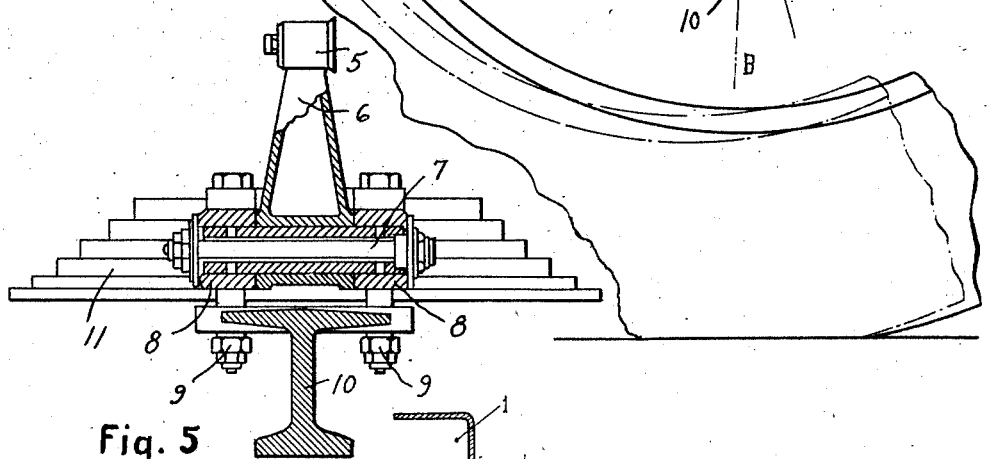
Fig. 5 is an enlarged detail vertical section of the oscillatory bracket.
Figure 2:
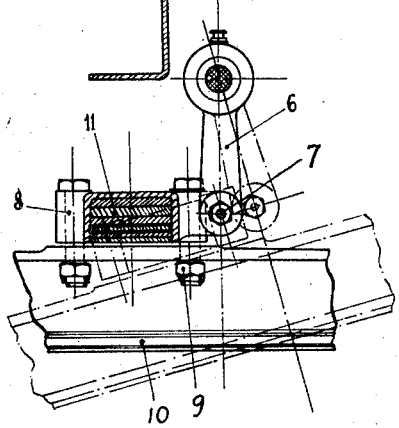

With reference to Figs. 1 and 2: 1 designates the main frame member; near the front end of which is pivoted at one end a stabilizing rod 2. The other end of said rod has a spherical head 4 which fits in a socket 5 in one end of a member 6 which is pivoted at the other end 7; on a piece 8 which is held by bolts 9 to the front axle 10. This piece is also the spring anchorage for the main spring 11.

On one of the articulations of the stabilizing rod 2 can be fitted a usual shock absorbing device as is here shown by 3.

Figure 3:
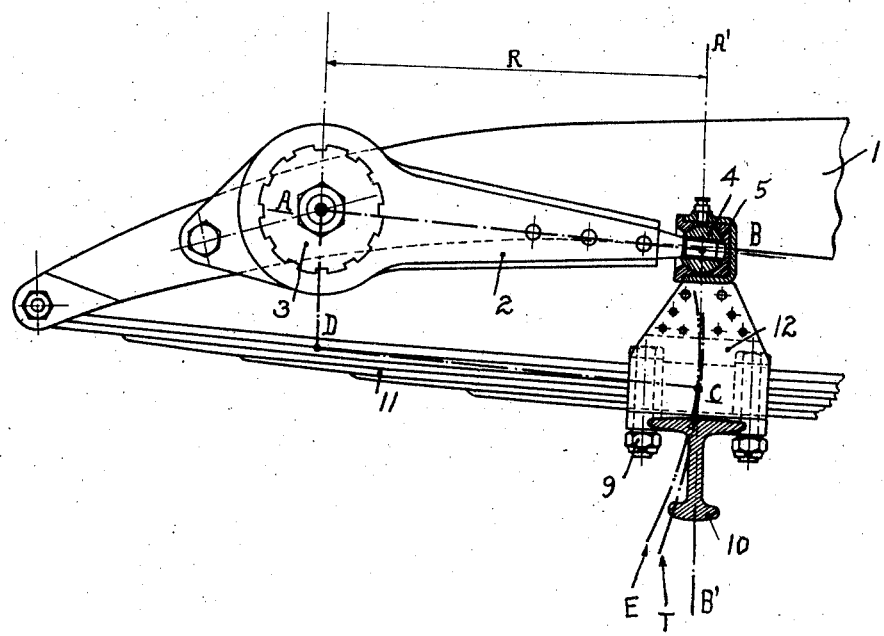
Figs. 3 and 4 show a side view and a cross section on line A' B' of Fig. 3 respectively of a second constructional form.
Figure 4:
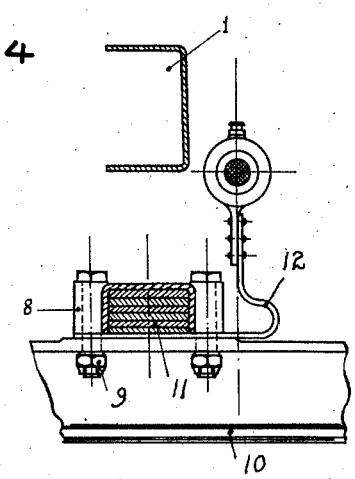

In a modified form of construction, Figs. 3 and 4, the socket 5, instead of being a part of the member 6 pivoted on 7, is fastened to a resilient piece of sheet steel 12, provided with a loop to increase its resiliency and held down directly by the spring anchorage.

The location of the pivot 3 is not indifferent; it must be chosen according to mathematical deductions. The stabilizing rod, the member 6 (12 in Figs. 3 and 4) and the spring must form an ideal articulated parallelogram (ABCD in Figs. 3 and 4) which must permit the up and down movements of the member 6 (or 12) and of the front axle fastened to it, but keeps it always parallel to itself and so avoids the torsional stresses on the front axle. Only one of the sides of the parallelogram (the front spring 11) is resilient. For this reason the location of the pivot 3 must be determined in this way. The spring is designed in its position of normal load and then the deflections of the point C (center of the spring anchorage) under varying loads are determined and the deflection curve E is obtained. The osculatory circle T of the deflection curve E in the point C (that is, of all the tangent circles to E in the point C, the one which follows most closely the shape of E in the points near C) is determined. If D be the center of said osculatory circle T, and the side BC is designed, then the pivot point A must lie in the intersection of the parallel line to CD passing through B and of the parallel line to BC passing through D. Any other location of the point A would cause torsional stresses on the front axle and abnormal deflection of the front spring every time the axle moved up and down in relation to the frame.

As one wheel is often lifted higher than the other by road obstacles the front axle must have the possibility of assuming inclined positions in a transverse plane (as shown with dotted lines in Figure 2; this is possible because, in the type shown in Figs. 1 and 2, the pivot 7 and the ball joints 4, 5 give the upright member 6 perfect lateral freedom. In the type shown in Figs. 3 and 4, the pivot joint 7 is avoided by the use of the spring steel sheet piece 12, which gives good lateral freedom because it is thin and looped, while it is very rigid in the longitudinal sense, as it has a very high moment of inertia. This form of construction has the advantage that it eliminates the necessity of lubricating the joint.

Of course many other forms of construction can be devised for this invention.

What I claim is:

1. A stabilizing linkage for the front axle of front wheel braked motor cars comprising in combination with a frame, an axle and a motor car spring, a vertical bracket mounted on the axle and adapted to oscillate in a longitudinal direction to the latter, a spherical socket at the free end of said bracket, and a rigid rod parallel to the spring one end of which terminates with a spherical head fitting in said upright member while its other end is directly articulated to the frame.

2. A stabilizing linkage for the front axle of front wheel braked motor cars, comprising, in combination with a frame, an axle and a motor car spring, an upright member mounted on the axle and adapted to oscillate in a longitudinal direction to the latter, a spherical socket at the free end of said upright member and a rigid rod parallel to the spring and equal to the radius of the osculator circle of the deflection curve of the point of the neutral axis of the front spring which is intersected by the axis of the upright bracket, said rod having one of its ends in the form of a spherical head pivoted in said spherical socket while its other end is directly articulated to the frame.

3. A stabilizing linkage for the front axle of front wheel braked motor cars comprising, in combination with a frame, an axle and a motor car spring, an upright member fitted on the axle and adapted to oscillate in transverse direction with respect to the frame, a spherical socket at the free end of said upright bracket, and a rigid rod parallel to the spring and having one of its ends in the form of a spherical head fitting in said socket and its other end articulated to the frame by means to damp the oscillation of said spring.

4. A stabilizing linkage for the front axle of front wheel braked motor cars, comprising, in combination with a frame, an axle and a motor car spring, an upright member mounted on the axle and adapted to oscillate transversely to the frame, a spherical socket at the free end of said upright member, and a rigid rod parallel to the spring and equal to the radius of the osculator circle of the deflection curve of the point of the neutral axis of the front spring which is intersected by the axis of the upright bracket, said rod having one of its ends in the form of a spherical head fitting in said socket and its other end articulated to the frame by means to damp the oscillations of said spring.

5. A stabilizing linkage for the front axle of front wheel braked motor cars comprising, in combination with a frame, an axle and a motor car spring, an upright bracket constituted by a plate of resilient material, arranged parallel to the car longitudinal axle and suitably looped to provide the greatest rigidity in the longitudinal plane of the frame and the highest elasticity in the transverse plane of the latter, a spherical socket at the free end of said upright bracket, and a rigid rod parallel to the spring and having one of its ends in the form of spherical head pivoted in said socket while its other end is directly articulated to the frame.

In testimony that I claim the foregoing as my invention I have signed my name.

GIULIO CESARE CAPPA.